United States Patent Office 2,920,203
Patented Jan. 5, 1960

2,920,203

FLUORESCENT PENETRANT INSPECTION MATERIALS AND METHODS

Joseph L. Switzer, Gates Mills, Ohio, and Donald W. Parker, Jr., Park Ridge, Ill., assignors, by mesne assignments, to Switzer Brothers, Inc., Cleveland, Ohio, a corporation of Ohio No Drawing. Application September 21, 1955
Serial No. 535,733

18 Claims. (Cl. 250—71)

This invention relates to improvements in materials and methods for the non-destructive testing of materials, pieces, parts, or structures (also hereinafter referred to as "test bodies") for subsurface flaws having surface openings. More particularly, this invention relates to improvements in fluorescent penetrants and penetrant inspection methods for testing test bodies.

The great increase in standards of performance and maintenance of industrial products and equipment during the past score of years may be attributed, in a substantial measure, to the increased adoption of and improvements in various non-destructive testing techniques to the point where, in many industries such as the aircraft industry, for example, such techniques have become essential and required procedures in manufacture and maintenance. Among the various non-destructive techniques which have become available to the art, the one which was most quickly seized upon and put to widespread use was that of fluorescent penetrant inspection, introduced to and adopted by American industry substantially contemporaneously with the issuance of the Robert C. Switzer Patent No. 2,259,400 for "Flaw Detection," in which patent the essential and fundamental elements of fluorescent penetrant inspection were first disclosed and claimed.

There are many reasons for the widespread usage of fluorescent penetrant inspection. In addition to being usually relatively rapid and inexpensive, such methods are also generally extremely sensitive and accurate, substantially regardless of the materials of the body being tested. Although fluorescent penetrant inspection is most widely used for metal bodies or portions thereof, it is also used for inspecting non-metallic bodies such as, for example, plastic, glass, and porcelain articles and parts. The fluorescent penetrant inspection methods are generally most sensitive in revealing the location of the surface openings of flaws in bodies of solid, non-porous material. However, the porosity of the material of the test body is a limiting factor, especially when employing penetrants compounded for and adapted to the material, only to the extent that porosity or lack of of solidity or structural strength of the material may render the procedural step of removing the penetrant from the surface of the body while retaining the penetrant substance in the flaws or the surface openings more difficult and may require experience in evaluating the flaw indications.

As above indicated, fluorescent penetrant methods are limited to the detection of flaws having surface openings; they will not reveal voids, faults, laminations or inclusions of foreign substances (such as slag stringers in iron or steel) which are wholly internal. Also, since, by definition, fluorescent penetrant inspection methods are only intended to reveal the location of the surface openings of flaws, the methods will not reveal flaws which at one time may have extended to the surface of the body but which have been so tightly closed (as by peening or other working of the surface or by plugging with a foreign substance) that no surface discontinuity is presented for the penetrant to enter, and the flaw has become, in effect, an internal flaw. The inability of fluorescent penetrant methods to reveal internal flaws substantially beneath the surface of the test body has frequently been found in practice, however, to be an asset rather than a deficiency of the methods. Except in highly stressed parts designed with a small factor of safety or where the internal flaws are gross, the use of other non-destructive testing methods which reveal such internal flaws may result in "over-inspection," i.e., the rejection of a part as flawed when the part may actually be perfectly serviceable; in practice it has been found that a surface crack so slight as to be detectable only by fluorescent penetrant inspection is sometimes more likely to cause failure of a part in service than a substantial flaw well below the surface. If manufacturing operations or conditions of use are such that one suspects that the surface openings of possible flaws may have been closed, then it may be advisable to use cleaning, etching, vibrating, or like procedures which will open possible closed flaws either before or during the inspection procedure. Whether fluorescent penetrant inspection methods are used because they permit the rapid location and evaluation of large surface flaws or the detection of minute ones, the fundamental steps of the method are the same as those set forth in the aforementioned Switzer patent, namely, the application to the surface of the test body of a substance which is fluorescent or contains fluorescent ingredients and which will penetrate the openings of the surface flaws which may be present, the removal of the penetrant from the surface of the body (usually after time has been allowed for penetration), and then inspection of the test body under relatively invisible fluorescigenous light, preferably in the substantial absence of visible light. The location of surface flaws will then be revealed by the emission, under the influence of the fluorescigenous light, of visible light by the penetrant which was retained in the flaws and/or flaw openings while the penetrant was removed from the surface of the test body.

Most of the penetrants employed in fluorescent penetrant inspection methods are oily materials or like liquids which have substantial wetting action with respect to the material of the test body. Inspection is usually conducted, by eye or with other light-sensitive means, after time has been allowed for surface-active forces (which caused the penetrant to enter the flaws in the first place) to cause the retained penetrant to creep to and/or out of the flaw opening and thus appear on the surface of the test body at or adjacent the flaw openings. Large streaks or smears of the retained fluorescent penetrant reveal the existence of a large flaw constituting a substantial void in the test body, whereas lines reveal cracks and dots reveal pores. Thus, fluorescent penetrant inspection methods not only locate surface flaws but permit an evaluation of the size and type of flaw and thus whether the flaws are of a type which should cause the test body to be discarded or repaired, if repair is possible or permitted.

Fundamentally, however, the reason fluorescent penetrant inspection methods are capable of great sensitivity and can permit ready location and evaluation of surface flaws once the fluorescent indications have developed is that the eye (or other light-sensitive means) only "sees" an indication when there is a contrast between light received from the indication and from adjacent areas. Under daylight or other normal visible illumination, the maximum contrast ratio available from ordinary non-fluorescent indications is in the order of twenty to one (i.e., the best blacks usually reflect at least four percent of the incident visible light, and the best whites seldom reflect much more than eighty percent or so of such incident light). Under the viewing conditions of fluorescent penetrant inspection methods, the contrast ratio is theoretically infinite (i.e., visible light is received from the fluorescent indication, and no visible light is received from the adjacent non-fluorescent areas of the test body). In practice, fluorescent penetrant inspection methods may provide contrast ratios in the nature of several hundred to one, and the effect is as though the fluorescent indications, even if very minute in area, had been magnified, without loss of distinctness, in the order of such contrast ratios.

In the decade and a half since fluorescent penetrant inspection methods have been introduced, great and substantial improvements have been made to increase the speed, safety, and accuracy or acuteness of the fundamental method. By improved penetrants and methods of handling them, a serious practical difficulty in the fundamental method has been greatly reduced. In carrying out the method, care must be exercised to avoid removing the penetrant from the flaws while removing it from the surface of the test body; otherwise, the method cannot serve its purpose. Yet, if, in avoiding removal of penetrant from the flaws, slight traces of penetrant are allowed to remain on the surface in unflawed areas, such traces will either give false indications or emit small amounts of light, known as "background scum." This "background scum" seriously reduces the desirable contrast ratio between the fluorescent indication and the non-fluorescent background. This problem has largely been overcome by the discovery that emulsification techniques and/or self-emulsifying penetrants (see U.S. Patent No. 2,465,078 and the co-pending application of De Forest and Parker, Serial No. 445,496, filed July 26, 1954, now U.S. Patent No. 2,806,959), permit a sharp separation and removal of penetrant from the test body surface without substantially effecting the penetrant in the flaws. Also, such emulsification techniques increase the safety of the method and reduce the cost of removing the penetrants by permitting the use of water for penetrant removal. Further improvements in and extension of the process have been made by formulating special penetrants adopted for the particular material of the test bodies, by locating and/or developing fluorescent ingredients which have greater brightness and by improving the formulations of compounds for developing the flaw indication. Such developers usually comprise a non-fluorescent, relatively opaque, light-reflecting absorptive material applied as a dry or wet coating over the surface of the test body after removal of the penetrant and before inspection under the fluorescigenous light. As such, the developers tend to draw more of the penetrant from the flaws, to increase the fluorescent brightness of the penetrant by providing a reflecting background for the emitted light, and to provide a greater contrast ratio by masking or quenching "background scums' which may remain on unflawed areas of the test body.

Developments in equipment for handling the test bodies, penetrants, and developers have increased the practicability of the methods. Substantial efforts have also been made to improve the sources of fluorescigenous light. In practice, such light is filtered ultra-violet or "black light," and such sources have comprised artificial light sources, such as mercury vapor discharge lamps which emit both visible light and a substantial proportion of invisible ultra-violet. These lamps are housed in opaque casings provided with a light filter which is relatively transparent to the ultra-violet and relatively opaque to visible light, thereby passing "black light" (widely used light of this type is shown in U.S. Patent No. 2,388,474). The more intense the "black light" upon the fluorescent indication, the brighter the indication becomes, within practical limits. One limiting factor is that the test body reflects the black light to the eyeball of the inspector and, the human eyeball being itself fluorescent, any substantial amount of black light falling on the eyeball creates a substantial amount of visible light within the eye, blurring the distinctiveness to the operator of the indication on the test piece and often causing acute physical discomfort. Another limiting factor in regard to the source of black light is that the efficiency of the light filter is limited, for practical purposes. If the light filter passes a substantial proportion of the ultra-violet generated by the light source, it will also pass an appreciable amount of visible light, which decreases the desired contrast ratio. If one selects a light filter which passes a very small proportion of visible light, it also becomes relatively opaque to ultra-violet, necessitating a light source of increased wattage to provide a sufficient intensity of black light; this becomes self-defeating for, by increasing the wattage of the light source to increase the amount of ultra-violet passing through the denser light filter, not only is the amount of visible light increased somewhat, but the cost of operating the light source and the amount of heat dissipated in the inspection area increases greatly. The inspection areas are generally booths closed or curtained to exclude extraneous visible daylight or artificial light and constitute relatively unpleasant working areas for the inspection; substantial amounts of heat within such areas can make the working conditions intolerable and even elaborate attempts to ventilate the inspection booths failed to overcome the general oppressiveness of having to work in substantial solitude in a relatively completely darkened closed area.

Summarizing, the art has developed penetrants which possess high fluorescent brightness and which permit sharp separation of the penetrant on the surface of the test body from that which penetrates the flaws. Further, the art has perfected developers which enhance the fluorescent brightness of the fluorescent indication and minimize fluorescent background scum. Further advance in the art toward the ideal of the infinite contrast ratio theoretically possible in fluorescent penetrant inspection methods appeared to await the development of more efficient black light filters and the development of some means in the inspection booths of overcoming the feeling of claustrophobia and other psychologically depressing effects induced in the inspectors when they perform exacting close work in closed, almost totally darkened booths in which the only visible light would be that emanating from the flaw indications and the "spill" of slight amounts of ghostly violet and blue light from the black light units. However, in the course of formulating pentrants for use in fluorescent penetrant inspection, a surprising synergistic effect has been discovered and, in analyzing the effect, it is now apparent that, in striving for the mathematical ideal of an infinite contrast ratio between a light-emitting flaw indication and non-light-emitting or non-reflecting background, the art has heretofore failed to appreciate or explore a substantial area for improvement of fluorescent penetrant inspection methods. As a consequence of this discovery, substantial improvements in contrast ratio may be obtained without further improvement of the light filter for the sources of black light or improvements in the booths in which the inspection is performed. In fact, in one aspect of our invention, inspection booths and filters over the sources of fluorescigenous energy, both essential heretofore in the commercial practice of fluorescent penetrant inspection, may be omitted altogether. Very high contrast ratios between flaw indications and the test body may be obtained, even in the presence of visible light incident to the test body.

An object of this invention is to achieve the advantage as set forth above by providing a novel fluorescent penetrant material containing a vehicle and a plurality of added fluorescent ingredients which, separately, emit fluorescent light which peaks at different wave lengths. Such a penetrant is characterized by the fact that it emits visible light of a color of substantially the same wave length as the color of the fluorescent emitted visible light of one of said ingredients but with a fluorescent brightness greater than the brightness of the penetrant would be if said one ingredient were the only fluorescent ingredient added to the vehicle of the penetrant. In other words, it is an object of this invention to provide a fluorescent penetrant containing a vehicle, one first added fluorescent ingredient emitting visible light of a given wave band, and at least one additional added ingredient which boosts the amplitude, i.e., the fluorescent brightness, of light emitted by said first added ingredient within the wave band of light emitted by said first added ingredient. Thereby a more efficient utilization of the energy of incident wide-band fluorescigenous light is effected.

Another object of this invention is to provide a method for using said fluorescent penetrant and unfiltered fluorescigenous energy in fluorescent penetrant inspection.

Another object of this invention is to provide an improved fluorescent penetrant containing, as a vehicle, a non-oily liquid which may be removed from the surface of a test body by washing in water but which will be retained in surface flaws in said test body.

Further objects and advantages of this invention will be apparent from the following further specification and claims.

In general, this invention stems from the discovery of and explanation for a phenomenon for which the term "fluorescent cascading" has been coined. This phenomenon was observed in a fluorescent penetrant comprising a penetrant vehicle in which there was dissolved a blacklight responsive fluorescent dye regularly employed in standard commercial fluorescent penetrants. This dye, when so dissolved, is characterized by a brilliant emission of visible light predominantly in the yellow-green range, peaking at approximately 5,100 Angstrom units. To this penetrant there was accidentally added a second dye which was known to be soluble in the penetrant vehicle and which was also known to be comparatively weakly fluorescent in vehicles similar to that of the penetrant, emitting, when so dissolved, blue visible light of a lower degree of visual distinguishability compared to the bright green fluorescence desirable in penetrants normally employed in fluorescent penetrant inspection methods. Out of curiosity to observe the degree to which the second dye would effect the expected whitening and widening of the wave band of the first dye toward bluish green, the double-dyed penetrant vehicle was tested as fluorescent penetrant under black light upon a standard flawed block regularly employed in testing fluorescent penetrant inspection compositions and procedures. Instead of the second dye's effecting the expected tinting of the visible light emitted by the first dye, the visible emission was of apparently the same wave band and peak of the first dye, namely, 5,100 A.U., but the fluorescent brilliance of the double-dyed penetrant was greatly enhanced, and without a whitening or widening of the band of emission.

Further work established that the peculiar fluorescent brightness of the foregoing double-dyed penetrant was not due to any effect of the particular penetrant vehicle first employed upon the brightness of either dye. The phenomenon was observed again when the dyes were dissolved in other solvent vehicles. No chemical reaction, such as would produce a new chemical having increased fluorescent brightness, would be expected from what was understood to be the chemical structures of the dyes, and none was observed. The phenomenon of untinted but enhanced brightness, therefore, appears to be attributable solely to a physical co-action between the dyes. To explain such a co-action, it was assumed as a hypothesis that the two dyes had absorption-emission curves so displaced with respect to each other in the Hertzian spectrum that the emission peak of the second or booster dye tended to mate or reciprocate with the absorptive valley of the first or emitting dye, so that fluorescent light energy which would normally be emitted by the second dye would actually not be emitted but would be absorbed by or transferred to the first dye; and further, that such transferred energy would be emitted as light energy of the same wave lengths as of the emission spectrum of the first dye. Whether such energy transference would be by actual emission of light by the second dye and immediate absorption by the first dye or whether energy transference would be by electron exchange between the co-dissolved dyes (electrons at a high energy level moving from molecules of the second dye to molecules of the first dye, and electrons at a lower energy level moving from the molecules of the first dye to molecules of the second) is a theoretical question which may be of no significance if the hypothesis of energy transference between the dyes is sound. The energy transference or cascading hypothesis, however, requires further speculation, namely, that in the range of shorter wave lengths spanned by the absorption valley of the second or "booster" dye (where the first dye is presumably non-absorptive or reflective) the absorption characteristics of the second or booster dye must predominate over any reflection characteristic of the first dye. Still another requisite characteristic of the booster dye, if the hypothesis is sound and cascading of energy does occur, is that the second dye be relatively reflective of or transparent to light of the emission range of the first dye.

In general, the above hypothesis of cascading appears to hold when applied to combinations of other fluorescent dyes whose absorptive-emission curves appear to approximate the conditions requisite for operation according to the theory. Departures in actual performance from what would be expected according to theory are generally attributable to the departure of the actual absorption-emission curves of the dyes from ideal curves and to the fact that the dyes are not perfect transformers of energy, just as no actual non-fluorescent colored dye has been found which exhibits perfect efficiency as a selective absorber and reflector.

Expressed in terms of emission and absorption characteristics of fluorescent dyes added to a suitable penetrant vehicle, the emission of the first added fluorescent dye may peak in the red range and exhibit maximum absorption in the yellow-green range, being less absorptive of light energy in the ranges of shorter wave-length light, i.e., the visible blue and violet and invisible near ultra-violet. To the penetrant vehicle is added a second or cascading fluorescent dye whose emission peaks in the yellow-green range, i.e., the range of maximum absorption of the first dye and whose absorption is at a maximum in the near ultraviolet to blue range. As indicated above, the second or cascading dye should not be especially absorptive in the orange to red range, i.e., it should be relatively transparent or reflective in the emission range of the first dye. In normal visible light, a solution of the first dye would appear to have a cerise or bluish-red color (sometimes identified as minus-green in the color photography art), and a solution of the second dye would appear yellow (sometimes identified as minus-blue in the color photography art). The resultant emission spectrum of the penetrant containing the cascading dyes is not a broadened range from yellow through red, as might be expected. Instead, the emission range of the combined or cascading dyes is substantially the same red range of the first dye, and the emission peak is in substantially the same range as the peak of the first dye but at a substantially greater amplitude. The total effect is that the dyes in cascading relationship to each other make a substantially greater efficient use of incident fluorescigenous energy, concentrating emission in a relatively narrow band and spreading absorption over a greatly wider band.

It is to be understood that the absorption and emission spectra of the dyes in cascading relationship are not limited to those given in the preceding general example as illustrative of the cascading principle; the emission peaks and absorption valleys may shift toward shorter wave lengths and may be less spaced. The significant relationship is that the absorption valley of the cascaded dye mates or substantially reciprocates with the emission peak of the cascading dye, and the cascading dye is substantially transparent or reflective in the emission band of the cascaded dye. Further, this invention is not limited to the use of two dyes in cascading relationship. Three dyes may be employed as, for example, where two cascading dyes are employed, the two having absorption valleys in different wave bands but both emitting approximately in the absorption valley of the cascaded dye and being transparent or reflective in the emission range of the cascaded dye. Or three dyes may also be used where a first dye is cascaded by a second dye, which, in turn, is cascaded by a third dye emitting approximately in the absorption valley of the second and being either substantially transparent or reflective in the emission bands of the first and second dyes. We have not found that it is practical to attempt to cascade more than three dyes, but it is within the scope of our invention to do so.

Illustrative, but not limitative examples of cascading fluorescent penetrants made according to our invention are as follows:

*Example 1.—Self-emulsifying—two dye*

| Vehicle | Parts by volume |
| --- | --- |
| Kerosene | 92 |
| Oil-soluble emulsifying agents: | |
| Atlas Tween 85 (Polyoxyethylene sorbitan trioleate) | 4 |
| Atlas Tween 80 (Polyoxyethylene sorbitan monoleate) | 2 |
| Arlacel C (Sorbitan Sesquioleate) | 2 |
| | 100 |

| Dyes | Grams per 100 Milliliters of Vehicle |
| --- | --- |
| (1) 4 N butylamino 1,8 naphthal N-butylimide | 0.25 |
| (2) 4 methyl 7 diethyl amino coumarin | 0.25 |

The oil-soluble emulsifying agents are dispersed in the kerosene to render the penetrant self-emulsifying when washed with water from the part being inspected. The dyes are then dispersed in the vehicle. The cascaded dye (1) emits in the yellow to yellow-green range when dissolved alone in the vehicle. The cascading dye (2) emits a seemingly relatively dim blue light if dissolved alone in the vehicle. When both are dissolved, the penetrant will emit fluorescent light of substantially the same color as if the cascaded dye alone were in the vehicle, but the fluorescence will be much brighter, especially when compared side-by-side with the fluorescent brightness of a penetrant containing only the dye (1) on cracked test blocks having cracks of substantially the same number and degree of fineness. It is only when the penetrants are compared as retained penetrants in the openings of fine flaws that a true evaluation of their brightness for fluorescent penetrant inspection can be made. Not only does a penetrant made according to this invention fluoresce much more brightly under conditions simulating conditions of actual use, but very fine flaws which might not be noticed or not even revealed by prior art penetrants are readily discernible when inspected with penetrants made according to this invention.

*Example 2.—Self-emulsifying—two dye*

To the vehicle of Example 1, the following dyes are added:

| Dyes | Grams per 100 Milliliters of Vehicle |
| --- | --- |
| (1) Rhodamine B base | 0.7425 |
| (2) 4 N butylamino 1,8 naphthal N-butylimide | 0.025 |

In this example, the cascaded dye (1) fluoresces red; the cascaded dye of Example 1, above, becomes the cascading dye in this example. The same relative increase in fluorescent brightness of the penetrant under fluorescigenous light is obtained.

*Example 3.—Self-emulsifying—three dye*

(A) The cascading dye (2) of Example 1, if added to Example 2, will obviously become a cascading dye for the cascading dye (2) of Example 2 which, in turn, will continue to cascade with the cascaded dye of Example 2.

(B) Another triplet of dyes in cascading relationship which may be added to a suitable vehicle is as follows:

| Dyes | Grams per 100 Milliliters of Vehicle |
| --- | --- |
| (1) Rhodamine B extra | 0.0486 |
| (2) (a) Rhodamine 6 GDN | 0.076 |
| (2) (b) 4 N butylamino 1,8 naphthal N-butylimide | 0.123 |

In the foregoing example, the cascading dyes (2)(a) and (2)(b) absorb in different bands, but both emit in a range in which the cascaded dye is absorptive.

In the three-dye cascading system, whether the dyes all cascade in series or the cascading dyes each cascade to the cascaded dye, a further increase in fluorescent brightness may be obtained, but the increase does not appear as pronounced as the increase obtained with two dyes in cascading relationship over a single dye. The explanation may be that it is generally not desirable to employ incident fluorescigenous light which contains appreciable proportions of light energy shorter than near ultra-violet. Otherwise, the shorter wave lengths of ultra-violet may be harmful to the inspectors working under it. If the inspector can be protected from the harmful effect of a wider spectrum of incident fluorescigenous light, a three-dye system, with dyes selected to absorb over the wider spectrum, may be used to give a greater boost to the brightness of the final cascaded dye, but generally the simplicity, economy, and effectiveness of the two-dye system using safe and conventional light sources whose substantial spectrum does not extend appreciably below the near ultra-violet range seems to outweigh any increase in brightness obtainable with a three or more dye system.

*Example 4.—Post-emulsifying*

The vehicle of Examples 1–3 above is especially formulated for self-emulsifying fluorescent penetrant for use in the water-wash fluorescent penetrant inspection method as disclosed and claimed in the United States Patent to Ward, No. 2,405,078 for "Method and Composition for Locating Surface Discontinuities," issued July 30, 1946. Cascading dyes may also be used advantageously in post-emulsifying penetrants formulated for use in inspection procedures as disclosed and claimed in the above-identified co-pending application of deForest and Parker, Serial No. 445,496, now U.S. Patent No. 2,806,959. For example, the dyes of Examples 1 and 2, above may be added to the following vehicle in the same proportion as in the vehicle of Examples 1 and 2:

| Vehicle | Parts by Volume |
|---|---|
| Dibutyl phthalate | 30 |
| Xylol | 70 |
|  | 100 |

*Solvent-removable penetrants.*—The basic patent on fluorescent penetrant inspection methods (R. C. Switzer Patent No. 2,259,400 for "Flaw Detection," issued October 14, 1941) discloses the removal of fluorescent penetrants by solvents or by wiping, abrasion, or other mechanical steps. Such non-emulsified fluorescent penetrants have largely been superseded by emulsifiable fluorescent penetrants of the type disclosed in the preceding examples for use in the above-mentioned Ward process or in the above-mentioned DeForest and Parker process. It has been found surprisingly practical and effective, however, to employ this invention in solvent-removable fluorescent penetrants for use according to the process as disclosed in the above-mentioned Switzer patent. Such fluorescent penetrants comprise a plurality of fluorescent dyes in cascading relationship to each other carried in a suitable vehicle having satisfactory wetting and penetrating characteristics for the test bodies. While such penetrants may be lipophilic in nature and soluble or dilutable in non-aqueous solvents for the vehicle, the most practical penetrants of this general class of solvent-removable penetrants are those which are soluble in, or at least relatively readily dilutable with, water (all hereinafter referred to as "water-soluble fluorescent penetrants"). In formulating such water-soluble fluorescent penetrants, two problems must be overcome: (1) the penetrants should not wash out of the flaws to be detected as readily as they may be washed from the surface of the test body and (2) the cascading dyes must be carried in a fluorescent state in the vehicle and remain in that state when retained in the flaw opening. The second problem is overcome by selecting dyes which are soluble in the vehicle directly or by means of one or more coupling agents in which a dye is soluble and which, in turn, is soluble in one or more major components of the vehicle. The first problem is often of no moment when the flaws to be detected are in the nature of deep, narrow cracks which mechanically protect the penetrant from wash-out. If the flaws are relatively wide or shallow, wash-out can be prevented by selecting a single or multi-component vehicle which is relatively slowly soluble in water except in aqueous mixtures predominantly consisting of water and exhibits a tendency to wet the walls of the flaws preferential to its tendency to rapidly dissolve in water. Examples of such suitable water-soluble fluorescent penetrants are as follows:

*Example 5.—Water-soluble—Single-component vehicle*

[VEHICLE: SULFONATED CASTOR OIL (TURKEY RED OIL)]

| Dyes | Grams, per 100 milliliters of vehicle |
|---|---|
| (1) Rhodamine B base | 0.25 |
| (2) 4 amino sulfo 1,8, naphthal 4' methyl phenyl-imide | 0.25 |

The dyes are dissolved directly in the vehicle, as by stirring. The cascaded dye (1) fluoresces red in solution; the cascading dye (2) fluoresces yellow. In combination they present an extremely bright red fluorescence. In use the penetrant exhibits excellent penetration on nearly all test bodies; after application and allowance of time for penetration, it is removed from the surface by subjecting it to moderate scrubbing sprays or by flushing it from the surface of the test body with water, depending upon whether expected flaws would be relatively deep or shallow. The vehicle is such that, in its undiluted state, it appears to dissolve relatively slowly in water, but as it becomes diluted, it dissolves rapidly. Thus, with normal care, the fluorescent penetrant will wash from the surface of the test body but remain in the flaws.

*Example 6.—Water-soluble—multi-component vehicle*

| Vehicle | Parts by volume |
|---|---|
| (1) Atlas G 1020 (polyoxyethylene sorbitol monoleate) | 10 |
| (2) Water | 90 |

The diluent, water, is added to the miscible component (1) and stirred, heated, or allowed to stand until an apparent true solution is obtained.

| Dyes | Grams per 100 milliliters of vehicle |
|---|---|
| (1) Rhodamine B base | 0.25 |
| (2) 4 amino sulfo 1, 8, naphthal 4' methyl pnenyl-imide | 0.25 |

The above dyes, the same as in Example 5, appear to dissolve in all components of the vehicle and cause the penetrant to fluoresce the same as in Example 5. The penetrant may be handled in the same manner as in Example 5 and resists wash-out.

*Example 7.—Water-soluble—multi-component vehicle*

| Vehicle | Parts by weight |
|---|---|
| (1) Dodecyl benzene sodium sulphonate | 5 |
| (2) Water | 1,000 |

The miscible component (1) is suitably dissolved in the diluent, water, as in the two preceding examples.

| Dyes | Grams per 100 milliliters of vehicle |
|---|---|
| (1) Uranine Yellow | .35 |
| (2) Beta methyl umbelliferone | .05 |

The dyes are dissolved in the vehicle, in which the miscible element appears and functions to enhance the solubility of the dye in the water as well as to impart a preferential tendency of the vehicle to remain in cracks rather than to be washed out. The cascaded dye (1) fluoresces yellow and the cascading dye (2) fluoresces blue; in combination in the vehicle they present an extremely bright yellow fluorescence in the small quantities which appear at or adjacent flaw openings at the time of inspection.

*Example 8.—Water-soluble—multi-component vehicle*

| Vehicle | Parts by weight |
|---|---|
| (1) Diethylene glycol | 56 |
| (2) Water | 50 |
| (3) Dodecyl benzene sodium sulphonate | 1 |

The above components are mixed and appear to mutually dissolve into each other.

| Dyes | Grams per 100 milliliters of vehicle |
|---|---|
| (1) Fluorescein | .93 |
| (2) 4 methyl 7 diethyl amino coumarin | .14 |

The above dyes are dissolved in the vehicle, the cascaded dye (1) fluoresces a greenish yellow and the cascading dye (2) fluoresces a blue; in combination in the vehicle they fluoresce a brilliant greenish yellow in the small quantities remaining in or around the flaws at the time of inspecting the test bodies.

*Example 9.—Water-soluble—multi-component vehicle—three dye*

| Vehicle | Parts by weight |
| --- | --- |
| (1) Iso-octyl phenyl ether of polyethylene glycol | 28 |
| (2) Diethylene glycol | 28 |
| (3) Water | 50 |

The above components are mixed and appear to dissolve mutually into each other.

| Dyes | Grams per 100 milliliters of vehicle |
| --- | --- |
| (1) Uranine yellow | 0.15 |
| (2) 4 N butylamino 1,8 naphthal N-butylimide | 0.15 |
| (3) 4 methyl 7 diethyl amino coumarin | 0.15 |

The foregoing vehicle has been found especially suitable. It exhibits a high degree of penetration without regard to the composition of the test body, i.e., it is equally successful in penetrating flaws in metal, glass, ceramics, or plastics, provided the flaws are clean and oil-free. It exhibits excellent washability, i.e., retention in flaws while leaving on unflawed surfaces no significant residual fluorescent scums or films which could give false indications or diminish the contrast of the background with true indications. Evaporation of the water in the vehicle during use is objectionable only in that washability may be decreased; instead of decreasing sensitivity, sensitivity appears to increase. No evidence of toxic reactions or dermatitis has been observed among operators working with penetrants employing this vehicle.

When the above dyes are dissolved in the above vehicle, the dye (3) appears to cascade both the other dyes (1) and (2) and the cascaded dye (2) appears to cascade the dye (1). In combination with each other and the foregoing vehicle, the dyes emit an extremely bright yellow fluorescence in and/or around the flaws at the time of inspection.

In employing the foregoing aqueous solvent-removable penetrants, the part to be inspected is suitably prepared, and the penetrant is applied to it by coating or immersion. Allowing sufficient time for penetration, the penetrant is washed from the surface of the body, preferably with a slightly scrubbing spray of water, care generally being taken to direct the spray obliquely to the surface of the article to wash off the penetrant without washing penetrant in the flow openings. The flaw indications may then be developed, as with absorptive powders or suspension of powders, such as French talc, light magnesium carbonate, etc., in the fashion disclosed in the above Ward patent. The part is then inspected under fluorescigenous lighting, where the fluorescence of the penetrant retained in the flows and appearing at the surface opening will reveal the location of the flaws.

All of the foregoing fluorescent penetrants, their fluorescent brightness being increased by the cascading dyes to give a greater contrast ratio between the penetrant appearing at the flaw openings and the unflawed areas of the test body, are suitable for use under filtered ultraviolet in substantial darkness and, when so used, will give brighter and more readily detectable indications than penetrants containing a single fluorescent dye or a plurality of non-cascading dyes. However, because of the extreme brightness of the fluorescent indications, it being possible to cause the penetrant to emit far more light in the range of emission of the cascaded dye than would be reflected by an equivalent area of the test body even under moderate incident illumination, it is now possible to carry out fluorescent penetrant inspection in relatively open areas having moderate visible lighting or under black lights having filters which pass a substantial percentage of visible light as well as more ultraviolet than stronger filters which filter out substantially all visible light. Under such conditions of inspection, the inspection booths, if used, may be sufficiently illuminated to overcome the depressing effect on the inspector of working in substantially total darkness. Likewise, the power of the black lights may be reduced, since with lighter filters, more of the ultraviolet generated by the actual light source will be passed by the filters.

Indeed, it is even possible to eliminate inspection booths and filtered sources of fluorescigenous light and to provide ample light for workers other than inspectors in the area in which inspection is carried on. This may be accomplished by illuminating the area with light sources which produce substantial quantities of ultraviolet and visible light of a wave-length less than the wave-lengths of the range of light emitted by the cascaded dye. For example, if the emitted light of the cascaded dye is red, the inspection area may be highly illuminated with mercury vapor lights which emit substantial amounts of ultraviolet and visible light up through green, but practically no red light. Fluorescent lighting tubes which are deficient in red light are also available. To heighten the contrast ratio between the red indications and the unflawed area of the test body subject to the incident illumination deficient in red, the inspector may wear goggles which readily pass red light but effectively filter out light in the range absorbed by the penetrant. Similarly, because the eye is usually highly sensitive to green light, it is often practical to illuminate the area with light sources providing ultraviolet and visible violet and blue light but deficient in green and longer wave lengths.

Other advantages and modifications of the above-disclosed invention will be apparent to those skilled in the art without departing from the scope of the invention as set forth in the appended claims. In the appended claims, the term "fluorescent dye" is to be understood to mean any organic or inorganic substance which is soluble in the penetrant vehicle and which is added to or dispersed in the penetrant vehicle to cause the penetrant vehicle to fluoresce, if the vehicle is non-fluorescent, or to cause the vehicle to fluoresce in a different hue from that of its natural fluorescence; if the penetrant contains a dye or other substance added to cause a liquid component of the vehicle to have a fluorescence simulating the natural fluorescence of the hydrocarbon fraction and the like, rather than to serve as a cascading or cascaded fluorescent dye in combination with another fluorescent dye in the penetrant, such dye is to be construed as part of the vehicle and not one of the added dyes recited in the claims. Likewise, it is to be understood that in the appended claims, the term "vehicle," unless otherwise connoted from the text of the claims, is to include any emulsifying agents or agents added to improve the penetrability or washability of the penetrant.

What is claimed is:

1. A penetrant composition for use in fluorescent penetrant inspection methods for locating flaws in test bodies consisting essentially of a flow penetrating liquid vehicle and a plurality of fluorescent dyes mutually dissolved in said vehicle, said dyes having emissive and absorptive spectra establishing a cascading relationship between the dyes wherein light energy emitted by a cascading dye peaks within the absorption range of a cascaded dye and light energy emitted by the cascaded dye peaks at a band of longer wave length than the band in which the cascading dye peaks, said cascading dye being substantially non-absorptive of light of the wave band of the emission peak of the cascaded dye and the emission peak of the cascaded dye being in the visible spectrum.

2. A penetrant composition as defined in claim 1 in which the emission peak of said cascaded dye lies in the red range and the range of maximum absorption lies in the yellow-green range and in which the cascading dye has a range of maximum absorption which extends into the ultraviolet.

3. A penetrant composition as defined in claim 1 in which the emission peak of the cascaded dye lies in the yellow-green range, and the range of maximum absorption lies in the blue range and in which the said cascading dye has a range of maximum absorption which extends into the ultraviolet.

4. A penetrant composition as defined in claim 1 in which the dyes are at least three in number, a first cascaded dye, a second cascading dye in cascading relationship to said first dye, and a third dye in cascading relationship to said second dye.

5. A penetrant compositon as defined in claim 1 in which the dyes are three in number, a first cascaded dye and two cascading dyes each in cascading relationship with said first dye but having different ranges of maximum absorption.

6. A penetrant composition as defined in claim 1 in which one of said dyes is a fluorescent rhodamine dye.

7. A penetrant composition as defined in claim 1 in which one of said dyes is a blue-fluorescing coumarin dye.

8. The method of inspecting test bodies for flaws comprising the steps of applying a fluorescent penetrant as defined in claim 1 to a test body, allowing said penetrant to remain on said body, removing penetrant from the surface of said test body, and then inspecting said test body under fluorescigenous light to locate flaws having surface openings, said fluorescigenous light illuminating said test piece being a light having a visible spectrum which is relatively deficient in the range of the emission of said penetrant with respect to the visible component of such fluorescigenous light which is of a shorter wave length than the said emission range.

9. The method of inspecting as defined in claim 8 in which said penetrant emits red light.

10. The method of inspecting as defined in claim 8 in which said penetrant emits green light.

11. The method of inspecting as defined in claim 8 in which said penetrant contains an emulsifying agent rendering said penetrant self-emulsifying and said penetrant is removed from the test body by washing the same with water.

12. The method of inspecting as defined in claim 8 in which said penetrant contains a water-immiscible vehicle and said penetrant is removed by applying an emulsifying agent to said test body after said penetrant has been applied and drained and a film of penetrant remains on the surface of the test body, allowing said emulsifying agent to disperse into said penetrant to a depth equal to said remaining film of penetrant, and washing said film of penetrant and dispersed emulsifying agent from said test body.

13. The method of inspecting defined in claim 8 in which said penetrant comprises a water-miscible vehicle relatively slowly soluble in water and washing said penetrant from said test body at a rate faster than said wash water can dissolve said vehicle until said penetrant has been washed from the surface of said test body but before said penetrant is washed out of the openings of surface flaws.

14. The method of inspecting as defined in claim 8 including the step of inspecting the test body through a filter passing light emitted by the fluorescent penetrant and excluding substantially all wave lengths of light reflected by said test body when illuminated by said source of fluorescigenous light.

15. A composition for inspecting test bodies for surface flaws consisting essentially of a water miscible vehicle more slowly soluble in water than said vehicle can be washed from the surface of said test body, first and second fluorescent dyes dissolved therein, said second fluorescent dye being mutually soluble and in cascading relationship with the first fluorescent dye in said vehicle, wherein light energy emitted by a first dye, a cascading dye, peaks within the absorption range of the second dye, a cascaded dye, and light energy emitted by the cascaded dye peaks at a band of longer wave length than the band in which the cascading dye peaks, said cascading dye being substantially non-absorptive of light of the wave band of the emission peak of the cascaded dye and the emission peak of the cascaded dye being in the visible spectrum.

16. A composition for inspecting test bodies for surface flaws as defined in claim 15 including a third fluorescent dye in cascading relationship with the other dyes in said penetrant.

17. A penetrant composition for inspecting test bodies consisting essentially of a vehicle consisting essentially of water and one or more water-soluble vehicle components selected from the class consisting of polyhydric alcohols and alkyl-aryl ethers of polyhydric alcohols, and a plurality of fluorescent dyes mutually dissolved in said vehicles, at least two of said fluorescent dyes being in cascading relationship with each other, wherein light energy emitted by a first dye, a cascading dye, peaks within the absorption range of the second dye, a cascaded dye, and light energy emitted by the cascaded dye peaks at a band of longer wave length than the band in which the cascading dye peaks, said cascading dye being substantially non-absorptive of light of the wave band of the emission peak of the cascaded dye and the emission peak of the cascaded dye being in the visible spectrum.

18. A penetrant composition as defined in claim 17 in which said vehicle consists essentially of water in excess of approximately thirty to forty percent by weight, diethylene glycol, and an alkyl-aryl ether of diethylene glycol.

References Cited in the file of this patent

UNITED STATES PATENTS

| | | |
|---|---|---|
| 2,071,471 | Neubert | Feb. 23, 1937 |
| 2,227,070 | De Boer | Dec. 31, 1940 |
| 2,405,078 | Ward | July 30, 1946 |
| 2,476,619 | Nicoll | July 19, 1949 |
| 2,478,951 | Stokely | Aug. 16, 1949 |
| 2,635,329 | De Forest | Apr. 21, 1953 |
| 2,707,236 | De Forest | Apr. 26, 1955 |

OTHER REFERENCES

"Solid Fluorescent Materials," by R. P. Johnson, American Journal of Physics, vol. 8, No. 3, June 1940, pages 143 to 155.

"Fluorescent Penetrant Inspection," by Greer Ellis, Steel, vol. 115, No. 16, October 16, 1944, pages 100–102, 164.

"Luminescence of Solids," by H. W. Leverenz, published by John Wiley and Sons, Inc., pages 338 to 340, 411, 412, 452 to 459, 470, published 1950.

Dedication 2,920,203.—*Joseph L. Switzer*, Gates Mills, Ohio, and *Donald W. Parker, Jr.*, Park Ridge, Ill. FLUORESCENT PENETRANT INSPECTION MATERIALS AND METHODS. Patent dated Jan. 5, 1960. Dedication filed June 27, 1966, by the assignee, *Switzer Brothers, Inc.*

Hereby dedicates to the Public the terminal portion of said patent.
[*Official Gazette September 13, 1966.*]